Sept. 18, 1928.  F. E. ROACH  1,684,516
COUPLING FOR CONDUITS
Filed July 20, 1927   2 Sheets-Sheet 1
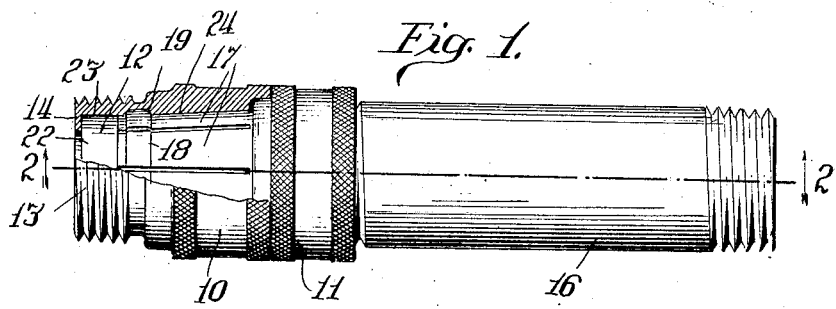
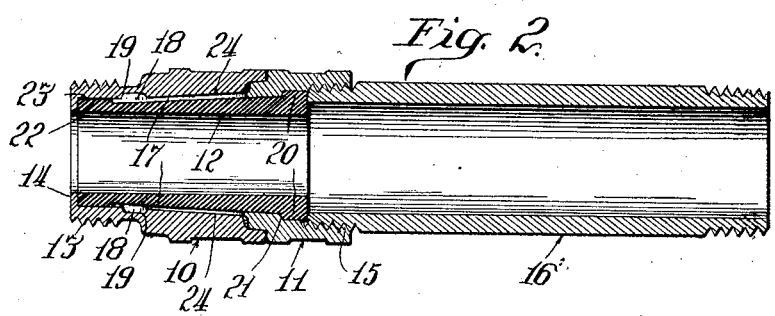
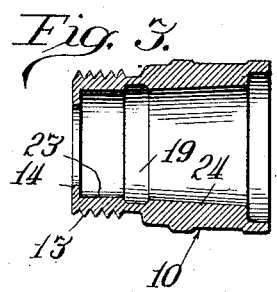
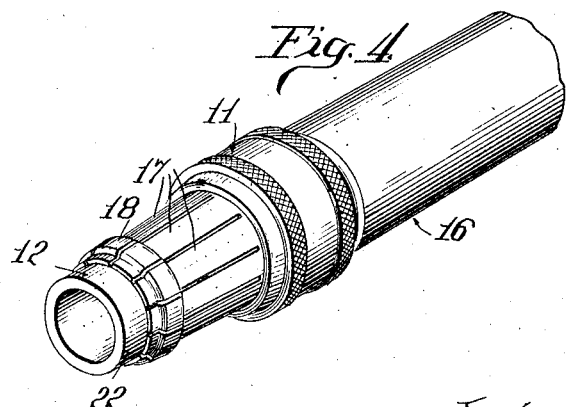
Inventor
Finis E. Roach
By Barnett & Truman
Attorneys Sept. 18, 1928.
F. E. ROACH
1,684,516
COUPLING FOR CONDUITS
Filed July 20, 1927   2 Sheets-Sheet 2
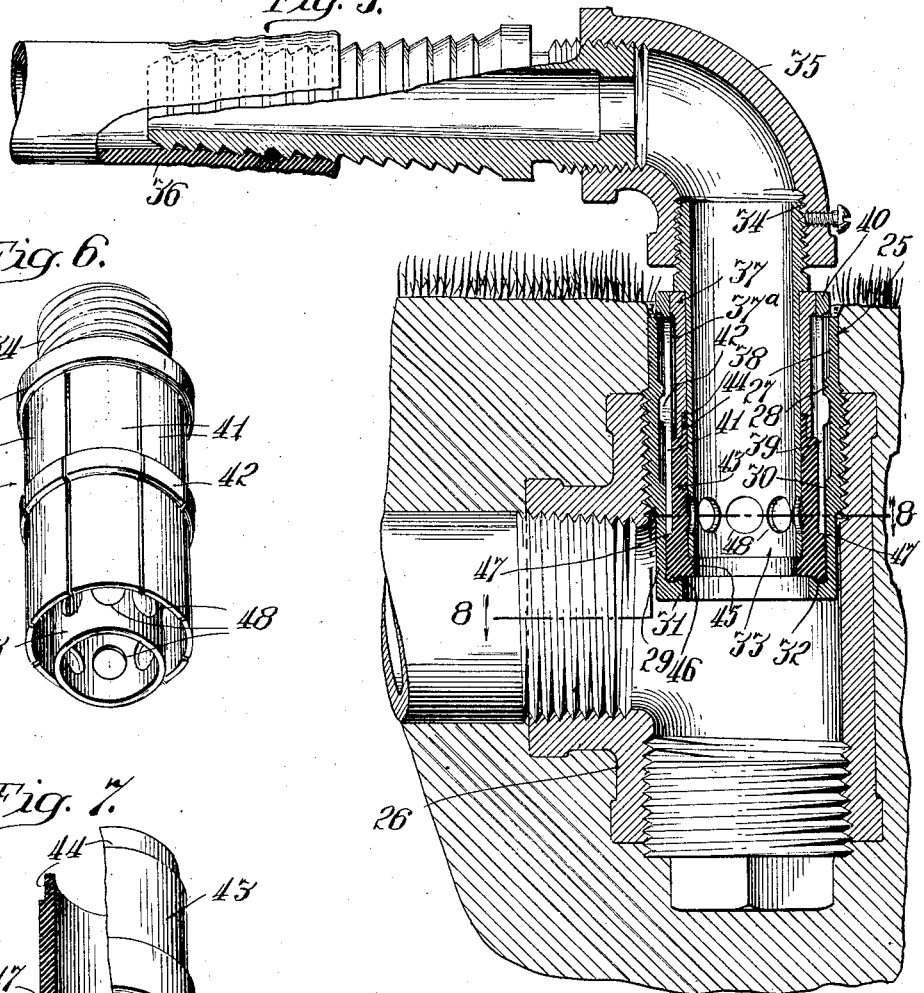
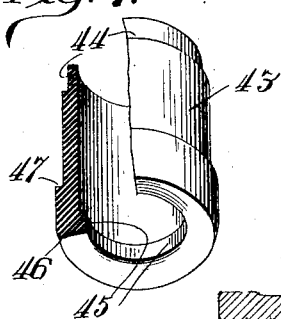
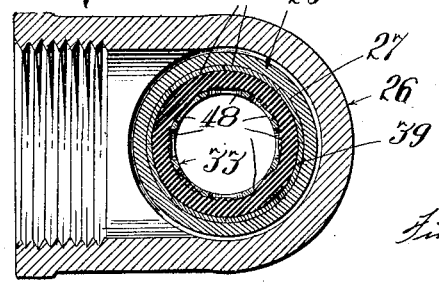
Inventor
Finis E. Roach
By Barnett + Truman
Attorneys Patented Sept. 18, 1928.

1,684,516

UNITED STATES PATENT OFFICE.

FINIS E. ROACH, OF CHICAGO, ILLINOIS.

COUPLING FOR CONDUITS.

Application filed July 20, 1927. Serial No. 207,198.

My invention relates to devices for coupling conduit sections together and has for its principal object the provision of an improved coupler having the general form of a plug and socket which is so constructed as to provide a fluid-tight connection when the parts are engaged, which may be readily connected and disconnected, and which, when subjected to internal fluid pressure, will withstand a considerable pulling strain longitudinally of the coupler without disengaging the members.

A more specific object is to provide a straight port coupling of the above general type, in which the plug and socket members have an interlocking engagement with each other and have capacity for rotational movement of one member with respect to the other without affecting the fluid-tight connection of the parts, which members may be made relatively rugged and at the same time permit sufficient resiliency of the locking elements to permit the plug and socket to be easily connected and disconnected from each other.

A further and more specific object of the invention is to provide the plug member, in a coupler of the above character, with a rigid core portion adapted to protect and support the resilient members when the plug member is disconnected from the socket and in which the locking members are so constructed and arranged that the internal pressure is exerted against the locking members at a point to produce a substantial locking pressure.

The invention consists further in the new and improved constructions, arrangements and combinations of parts and devices hereinafter described and claimed for carrying out the above stated objects and such other objects as will appear from a detailed description of the two embodiments shown in the accompanying drawings.

In the drawings:

Fig. 1 is a side view, partly in elevation and partly in section, of a conduit coupling constructed in accordance with my invention; the plugs and members of said coupling being attached to a section of conduit.

Fig. 2 is a vertical section taken on line 2—2 of Fig. 1.

Fig. 3 is a detail view in section of the socket member shown in the preceding figures.

Fig. 4 is a view in perspective of the plug member shown in Figs. 1 and 2.

Fig. 5 is a vertical cross section of another embodiment of my invention; the coupling illustrated in this figure being shown as a ground plug and socket in connection with an underground sprinkling system.

Fig. 6 is a view in perspective of the metal portion of the plug member shown in Fig. 5.

Fig. 7 is a view in perspective, partly in section, of a packing member forming a part of the plug member shown in Fig. 5, and Fig. 8 is a cross-sectional view taken on line 8—8 of Fig. 5, looking in the direction indicated by the arrow.

In Figs. 1 to 4 inclusive, I have illustrated one embodiment of my invention, which consists of a cylindrical socket member 10, a resilient plug 11 adapted to interlock within the socket member, and a sealing member 12. The socket member 10 is provided at one end with screw threads 13 adapted for engagement with a correspondingly threaded opening of a conduit member (not shown). This end of the socket member is formed with an inwardly projecting flange 14 against which one end of the sealing member 12 bears when the plug portion of the coupler is interlocked within the socket. The spring plug 11 is provided at one end with an internally threaded portion 15 adapted to have a threaded engagement with a conduit section 16. The other end of the plug is formed with a plurality of spring tongues 17, each of which is provided near its end with a bead 18 adapted to snap into locking engagement with the walls of a recess 19 formed on the inner surface of the socket member, so as to effect an interlocking engagement of the socket and plug members of the coupler. The sealing member 12 consists preferably of a rubber tube formed at one end with a flange 20 adapted to be clamped between a shoulder 21 of the spring plug and the end of the conduit section 16, so as to provide a fluid-tight connection at this point. The body portion of the sealing member preferably tapers in thickness to a point near the other end thereof and terminates in a cylindrical portion 22 of uniform diameter. The last mentioned portion of the sealing member, when the said member is in its operative position, extends beyond the ends of the spring tongues 17 of the plug member and bears against the flange 14 and the inner wall 23 of the socket member so as to provide a fluid-tight seal at these points.

In operation, the plug member, assembled as shown in Fig. 4, is inserted in the socket member 10. The inward movement of the plug causes the beads 18 of the spring tongues 17 to bear against the inclined wall 24 of the socket member and are, therefore, forced inwardly toward the axis of the plug until they clear the edge of the groove 19, whereupon the said beads, by reason of the resiliency of the tongues, and also by reason of the resiliency of the sealing member 12, snap into interlocking engagement with the wall of the groove 19. The groove 19 and likewise the beads 18 are formed with curved edges so that the plug may be disengaged from the socket member by pulling outwardly on the plug. When the fluid pressure is present in the conduit, the pressure of the fluid forces the sealing member outwardly against the walls 23 and also holds the beads 18 of the spring tongues into tight interlocking engagement with the groove 19. Under such conditions the coupler member cannot be readily disengaged because such disengagement must not only overcome the spring tension of the tongues 17, and the resiliency of the rubber tube 12, but must also overcome the internal pressure of the fluid.

In Figs. 5 to 8 inclusive, I have shown another embodiment of my invention. This embodiment is especially suitable for use in connection with a lawn sprinkling system in which the hose is connected at or below the surface of the ground with an underground water supply pipe.

The coupling consists of a cylindrical socket member 25 adapted to be threaded into a T-shaped fitting 26 of an underground water supply system. The said socket is preferably threaded into the T-fitting so as to permit the socket to be so adjusted that the upper end thereof will be slightly below the surface of the ground, as shown in Fig. 5. The socket is formed with a cylindrical portion 27 on which is formed an inwardly projecting rib 28. The said rib is preferably rounded so as to present rounded shoulders adapted to be engaged by a locking portion of the plug member of the coupling. The lower portion 29 of the socket member is formed with an inner surface 30 slightly less in diameter than the surface 27 and is provided at the lower end with an inwardly projecting flange 31, the upper surface of which is formed with an annular groove 32.

The plug member of the coupling consists preferably of a hollow cylindrical core 33 provided at its upper end with screw threads 34 adapted to have a threaded engagement with an elbow 35 to which the hose section 36 is attached by any suitable means. Secured to the upper portion of the core 33 is a sleeve member 37 which is preferably fixed to the core so as to form a part of it. The lower end of the sleeve 37 is recessed, as indicated by the reference number 38, so as to provide the inner surface with a portion of greater diameter than the external diameter of the core 33. A resilient tubular member 39 consisting preferably of a ring 40 and a plurality of resilient tongues 41 is secured to the upper end of the sleeve 37, preferably by brazing or by a threaded engagement. Each of the resilient tongues is formed with a bead portion which when considered collectively provides an external rib extending around the resilient member. Preferably the external rib 42 is substantially mid-way between the upper and lower ends of the resilient tongue and is adapted when the plug member is inserted in the socket to snap over the rib 28 of the socket member; there being sufficient clearance 37$^a$ between the sleeve 37 and the resilient tongues to permit the tongues to flex inwardly when the external rib 42 is forced over the rib 28. A resilient sealing member 43, preferably a rubber tube, surrounds the lower portion of the cylindrical core 33 and is provided with a reduced portion 44 adapted to fit within the recessed portion 38 of the sleeve 37 so as to provide a fluid-tight connection at this point of the coupling. The lower end of the sealing member is formed with an inwardly projecting flange 45 which bears against the end of the core 33 and is provided with a rib 46 which fits into the groove 32 formed in the flange 31 of the socket member. The external surface of the sealing member 43 is also reduced in diameter so as to provide a shoulder 47 which normally bears against the lower ends of the flexible tongues 41. The external diameter of the lower end of the resilient sealing member 43 is preferably such that it can be readily inserted in the cylindrical portion 30 of the socket member but which upon axial compression will effect a tight fit with the inner surface of said socket. The external diameter of the resilient tongue portion of the member 39 is preferably such as to provide a snug working fit with the inner surface of the cylindrical portion 30 of the socket, but which nevertheless will permit the socket member to be rotated freely within the socket. The lower portion of the cylindrical core 33 is formed with a plurality of openings 48 which are disposed preferably near the lower extremity of the resilient tongues 41 so that the pressure of the fluid in the coupling will be exerted against the extremities of the resilient tongues 41 and thereby hold the external rib 42 in locking engagement with the inwardly projecting rib 28 of the socket member.

In operation the plug member of the coupling is inserted in the socket until the external rib 42 of the flexible tongues 41 snap over the projecting rib 28 of the socket. The snap engagement of the ribs 42 and 28 is effected by the resiliency of the tongues 41 and by the resiliency of the sealing member 47;

both of said members being adapted to yield inwardly to permit the interlocking engagement of the said ribs. The water passing through the coupling member under pressure, enters the openings 48 of the cylindrical core 33 and exerts pressure against the inner wall of the sealing member and thereby forces the spring tongues outwardly. This construction directs the pressure of the water against the extremities of the tongues 41 and at a substantial distance from the locking rib 42 and therefore increases the locking force at the point of engagement of the ribs 42 and 28.

When using the coupling as a ground connection for a lawn sprinkling system, the upper end of the socket member is substantially concealed by the surrounding grass. If desired, the hole may be completely concealed by inserting a suitable plug of turf in the upper end of the socket when the plug member of the connector is removed. The plug of turf may be blown out by the pressure of the water, or otherwise removed, when it is desired to connect the hose to the underground water supply system.

While I have described my invention in connection with certain specific constructions, it will be obvious that the constructions of the embodiments herein shown might be changed in various ways without departure from the spirit of the invention. I, therefore, wish it understood that I contemplate all such changes in construction that come within the scope of the appended claims.

This application is in part a division of my application for improvements in coupling for conduit, Serial No. 140,580, filed October 9, 1926.

I claim:

1. In a coupling for conduit sections, a socket member provided with means for attachment to a conduit section, and having a locking groove on its inner surface, a plug member provided with resilient tongues formed with beads adapted to snap into said locking groove, and a rubber tube arranged within said socket and plug and adapted to expand against the walls thereof and against the spring tongues to maintain said tongues in interlocked engagement with said locking grooves and to provide a fluid tight connection between the socket and plug members.

2. In a coupling of the character described, a socket member and a plug member adapted to be interlocked with each other by movement of said members axially with relation to the other; one of said members being formed with resilient tongues provided with beads adapted to snap into engagement with the other member, and means adapted to exert pressure against said tongues to maintain them in interlocking engagement with the said other member.

3. In a coupling of the character described, a socket member, and a plug member adapted to be moved axially of the socket into interlocking engagement therewith; one of said members being formed with resilient tongues provided with beads adapted to snap into engagement with the other member to provide said interlocking engagement, and a resilient sealing member adapted to exert pressure against said tongues to maintain them in interlocked engagement with the said other member.

4. In a coupling of the character described, a socket member formed with a shoulder extending around its inner surface, and a plug member movable axially of the socket into interlocking engagement with said shoulder; said plug being provided with resilient tongues formed with beads adapted to snap over said shoulder when the plug is in its operative position, and a resilient sealing member adapted to exert pressure against said tongues to maintain the beads thereof in interlocked engagement with the said shoulder.

5. In a coupling of the character described, a socket member, a plug member movable axially of the socket into interlocking engagement therewith; one of said members being formed with resilient tongues formed with beads adapted to snap into engagement with the other member, and a rubber tube adapted to exert pressure against said tongues to maintain them in interlocking engagement with the said other member.

6. In a coupling of the character described, a socket member formed with an internal shoulder, and a plug member movable axially of the socket into interlocking engagement therewith, comprising a plurality of spring tongues formed intermediate their ends with beads adapted to snap into engagement with the shoulder of said socket, and resilient sealing means for exerting pressure against the ends of said tongues to maintain said interlocking engagement.

7. In a coupling of the character described, a socket member formed with an internal shoulder extending around the inner surface of the socket, and a plug member movable axially of the socket into interlocking engagement therewith and with capacity for rotation in said socket when in its applied position, comprising a plurality of spring tongues formed intermediate their ends with beads adapted to snap into engagement with the shoulder of said socket, and resilient sealing means for exerting pressure against the ends of said tongues to maintain said interlocking engagement.

8. In a coupling of the character described, a socket member formed with an internal shoulder extending around the inner surface of the socket, and a plug member movable axially of the socket into interlocking engagement therewith and with capacity for rotation in said socket when in its operative position, comprising a plurality of spring tongues formed intermediate their ends with beads adapted to snap into engagement with the shoulder of said socket, and a rubber tube arranged to bear against the inner surfaces of said tongues and adapted to be expanded by the pressure of fluid passing through said coupling to hold said spring tongues in their interlocked engagement with the socket member.

9. In a coupling of the character described, a socket member formed with an internal shoulder, and a plug member movable axially of the socket into interlocking engagement therewith comprising a plurality of spring tongues formed intermediate their ends with beads adapted to snap into engagement with said shoulder, and a rubber tube arranged to bear against the inner surface of said socket and against the inner surfaces of said tongues to provide a fluid-tight joint between the socket and plug and to exert pressure against said spring tongues to hold them in their interlocked engagement with said socket member.

10. In a coupling of the character described, a socket member formed with an internal shoulder extending around the inner surface of the socket, and a plug member movable axially of the socket into interlocking engagement therewith and with capacity for rotation in said socket when it is in its operative position, comprising a plurality of spring tongues formed intermediate their ends with beads adapted to snap into engagement with the shoulder of said socket, and a rubber tube arranged to bear against an inner surface of said socket and against the inner surfaces of said tongues, whereby expansion of said tube by the pressure of fluid passing through said coupler provides a fluid tight connection of the socket and plug and maintains said spring tongues in their interlocked engagement with said socket.

11. In a coupling of the character described, a socket formed at one end with a flange and at a point intermediate its ends with an internal rib providing a shoulder extending around the inner surface of the socket, and a plug member adapted to interlock with said socket with capacity for rotary movement, comprising a central cylindrical core providing a straight port through said coupling, a plurality of resilient tongues surrounding said core, and provided with portions adapted to snap over the said internal ribs of the socket, and a resilient sealing member surrounding said core and adapted to be pressed against the flange of said socket to provide a fluid tight joint and to press against the extremities of said flexible tongues to hold them in their interlocked engagement with said rib.

12. In a coupling of the character described, a socket formed at one end with a flange and at a point intermediate its ends with an internal rib providing a shoulder extending around the inner surface of the socket, and a plug member adapted to interlock with said socket with capacity for rotary movement, comprising a central cylindrical core providing a straight port through said coupling and formed also with transverse passages, a plurality of resilient tongues surrounding said core and formed with beads at a substantial distance from their free ends and adapted to snap over the said internal rib of the socket, and a resilient sealing member surrounding said core and adapted to be pressed against the flange of said socket and against the core to provide a fluid tight joint and to close said transverse passages through the core, whereby the said sealing member is expanded by the pressure of fluid passing through the coupling so as to exert pressure outwardly against the end portions of said tongues.

13. In a coupling of the character described, a socket formed at one end with a flange and at a point intermediate its ends with an internal rib providing a shoulder extending around the inner surface of the socket, and a plug member adapted to interlock with said socket with capacity for rotary movement, comprising a central cylindrical core providing a straight port through said coupling, provided on its external surface with means providing an undercut shoulder, and formed intermediate said undercut shoulder and one end with a plurality of transverse openings; a plurality of resilient tongues surrounding said core and formed with beads adapted to snap into engagement with the internal shoulder of the socket, and a resilient sealing member formed at one end to fit within the undercut portion of said external shoulder and formed at the other end with a flange extending beyond the edge of said core and adapted to bear against the grooved flange of said socket; the said openings in the core being disposed substantially at the ends of said spring tongues whereby the pressure of the fluid passing through the coupling expands the said sealing member so as to exert pressure against the extremities of said spring tongues.

14. In a coupling of the character described, a cylindrical socket formed at one end with a portion of reduced diameter and with an inwardly projecting flange and at a point intermediate said portion of reduced diameter and the opposite end of the socket with an inwardly projecting rib providing a shoulder extending around the inner surface of said socket, and a plug member adapted to interlock with said socket with capacity for rotary movement comprising a central cylindrical core formed near one end with transverse openings communicating with a central passage therethrough and formed at its other end with means for engagement with a conduit section, a sleeve member recessed at one end and adapted to surround the said core to provide an external undercut shoulder, a plurality of resilient tongues secured to said sleeve member and formed with beads adapted to snap into engagement with the inwardly projecting rib of the socket, and a resilient sealing member interposed between the extremities of said resilient tongues and the external surface of said core, and adapted at one end to fit within the undercut shoulder to provide a fluid-tight connection and at the other end to bear against the inwardly projecting flange and the reduced diameter of the socket, for the purpose described.

FINIS E. ROACH.